United States Patent [19]
Bedetti

[11] Patent Number: 6,062,487
[45] Date of Patent: May 16, 2000

[54] METHOD AND DEVICE FOR THE CONTROLLED BREAK-UP OF LIQUID JETS

[75] Inventor: Gianfranco Bedetti, Milan, Italy

[73] Assignee: Urea Casale S.A., Lugano-Besso, Switzerland

[21] Appl. No.: 08/903,688

[22] Filed: Jul. 31, 1997

[30] Foreign Application Priority Data

Aug. 1, 1996 [EP] European Pat. Off. .............. 96112397

[51] Int. Cl.[7] ....................................................... B05B 3/10
[52] U.S. Cl. ............................... 239/7; 239/101; 239/223; 239/380
[58] Field of Search .................................. 239/380, 101, 239/7, 223

[56] References Cited

U.S. PATENT DOCUMENTS

| | | | |
|---|---|---|---|
| 2,913,232 | 11/1959 | Silverman | 239/380 X |
| 3,220,653 | 11/1965 | Waldrum | 239/380 X |
| 3,340,334 | 9/1967 | Feldman et al. | |
| 4,049,318 | 9/1977 | Fruin | 239/380 X |

FOREIGN PATENT DOCUMENTS

| | | | |
|---|---|---|---|
| 2228534 | 12/1974 | Canada . | |
| 1129165 | 8/1982 | Canada . | |
| 2021707 | 7/1970 | France . | |
| 410681 | 3/1925 | United Kingdom | 239/380 |
| 1335896 | 10/1973 | United Kingdom | 239/380 |

*Primary Examiner*—Kevin Weldon
*Attorney, Agent, or Firm*—Sughrue, Mion, Zinn, Macpeak & Seas, PLLC

[57] ABSTRACT

A method for the controlled break-up of liquid jets for production of substantially monodispersed drops stands out for the fact that it comprises the steps of feeding a plurality of first liquid jets having steady motion to a plurality of mutually independent sectors and defined in a perforated surface, forming a head of liquid in the sectors near the perforated surface, causing the liquid to flow across the perforated surface to form a plurality of second liquid jets, periodically changing with a predetermined frequency the momentum of the liquid fed to a predetermined sector so as to impart to the liquid present in said sector a disturbance of predetermined magnitude consisting of a periodic change in the pressure near the perforated surface which is transmitted to the second liquid jets causing their controlled break-up in a plurality of substantially monodispersed drops.

19 Claims, 4 Drawing Sheets

METHOD AND DEVICE FOR THE CONTROLLED BREAK-UP OF LIQUID JETS

DESCRIPTION

Field of Application

The present invention relates to a method for the controlled break-up of liquid jets for the production of substantially monodispersed drops.

In the following description and the subsequent claims, with the term: 'substantially monodispersed drops', it is intended to mean essentially spherical drops of liquid of substantially identical diameter.

The present invention also relates to a device for implementation of the above mentioned method.

As known, in the field of prilling of melted materials in more or less viscous liquid form, e.g. for the production of fertilizers, the requirement to provide a method of controlled break-up of liquid jets which on the one hand would allow obtaining substantially monodispersed drops and on the other hand would be reliable, easy to implement and not requiring high energy consumption and operating costs is becoming more urgent.

In the following description, with the term: 'prilling', it is intended to mean a process by which a melted material in liquid state is made to pass through a plurality of holes to form corresponding liquid jets which break up into a plurality of drops which solidify into solid granules upon cooling. Generally, the solidification takes place by free fall of the drops in counter-current against an air flow in a suitable device called prilling tower.

This process is based on the phenomenon according to which liquid jet breaks up into a plurality of drops due to dynamic instability resulting from its surface tension and specifically whenever the amplitude of oscillation of the liquid jet increases until it becomes equal to the radius of the jet.

The factors at the origin of this dynamic instability of the jet can be external, e.g. disturbances caused by friction with air, or internal such as disturbances due to turbulence of the liquid.

Prior Art

In order to meet the above mentioned requirement, there have been proposed methods which make it possible to obtain substantially monodispersed drops through the controlled break-up of a liquid jet to which is transmitted a disturbance of predetermined magnitude in such a manner that the wavelength of oscillation of the jet is greater than its circumference.

Indeed, it has been found possible to obtain homogeneous and regular break-up of a liquid jet by transmitting thereto an oscillation of a wavelength substantially between the following values:

$$7*r < \text{lambda} < 14*r \tag{1}$$

where r is the radius of the liquid jet and lambda is its wavelength (see: J. M. Schneider and C. D. Hendricks, "Source of Uniform Liquid Droplets", Review of Scientific Instruments, Vol. 35, No. 10, 10/1964).

In general, according to the theory of C. Weber (see for example, "Atomization and Spray Drying", chapter 1, W. R. Marshall Jr., Chem. Eng. Progr. Monogr. Series, no. 2, vol. 50, 1954), the wavelength of oscillation most effective for obtaining controlled break-up of a liquid jet and hence substantially monodispersed drops is determined by the following formula.

$$\text{lambda}/r = 8.886*(1+3Z)^{1/2} \tag{2}$$

where r is the radius of the liquid jet, lambda is its wavelength and Z is the ratio of the square root of Weber's number to Reynolds' number ($Z = We^{1/2}/Re$).

The methods according to the prior art provide this controlled break-up by changing with a predetermined frequency the flowrate of the jets forming liquid in such a manner as to transmit to the jets an oscillation of desired wavelength.

As an alternative, the disturbance responsible for a controlled break-up of the liquid jets is imparted according to the above mentioned methods by means of:

- acoustic vibrations of predetermined frequency produced by a sound source and transmitted through the air to the liquid jets leaving a perforated surface;
- acoustic vibrations of predetermined frequency produced by a sound source and transmitted in the air or in the gas standing over the head of the jets forming liquid contained in a suitable perforated basket;
- vibrations transmitted directly to the jets forming liquid by means of vibrators, acoustic sources or rotating valves;
- mechanical vibrations appropriately transmitted to the perforated basket for jets formation or parts thereof.

Methods of this type are described e.g. in EP-A-0 233 384, EP-A-0 320 153 and U.S. Pat. No. 4,585,167.

However, the above mentioned methods display a series of drawbacks, the first of which is that they are difficult to implement and unreliable.

Indeed, to be effectively implemented, these methods necessitate sophisticated equipment complicated to manufacture and requiring constant maintenance.

Consequently, to appropriately control the break-up of the liquid jets, high construction, operating and maintenance costs are necessary.

In addition, because of their complexity, mainly due to the need to provide means of transmission of acoustical or mechanical vibrations, the equipment for implementation of the methods according to the prior art cannot ensure obtaining substantially monodispersed drops in a constant manner over time.

SUMMARY OF THE INVENTION

The technical problem underlying the present invention is to make available a method for the controlled break-up of liquid jets allowing obtaining substantially monodispersed drops and simultaneously which would be reliable, easy to implement and not requiring high energy consumption and operating costs.

According to the present invention the above mentioned problem is solved by a method of the type indicated above and comprising the following steps:

- feeding a plurality of first liquid jets having steady motion to a plurality of mutually independent sectors defined in a perforated surface;
- forming of a head of liquid in these sectors near the perforated surface;
- causing the liquid to flow across the perforated surface to form a plurality of second liquid jets;
- periodically changing with a predetermined frequency the momentum of the liquid fed to a predetermined sector so as to impart to the liquid present in that sector a disturbance of predetermined magnitude consisting of a periodic change of the pressure near the perforated surface which is transmitted to the second liquid jets causing their controlled break-up in a plurality of substantially monodispersed drops.

In the following description and subsequent claims, with the term: 'liquid jet having steady motion', it is intended to mean liquid jets having flowrate and velocity constant in time.

In the following description and subsequent claims, with the term: 'mutually independent sectors', it is intended to mean sectors hydraulically separate from each other.

Advantageously, by means of the present invention it is possible to obtain substantially monodispersed drops by feeding the liquid for formation of the second jets under stationary conditions and at the same time causing variation in an appropriate manner of the pressure of this liquid.

This is made possible in particular by division of the perforated surface in a plurality of sectors and by feeding to the sectors a plurality of first jets.

Indeed, by proceeding in this manner it was surprisingly found that it is sufficient to appropriately change the momentum of the liquid fed to a predetermined sector, while holding constant the momentum of the first jets fed to the perforated surface and thus operating under stationary conditions, to obtain in a simple but at the same time accurate and reliable manner a controlled break-up of the second liquid jets leaving the perforated surface.

Advantageously, the change in the momentum of the liquid fed to a predetermined sector takes place periodically and with time intervals such as to transmit to the second liquid jets an effective disturbance of a wavelength greater than their circumference and preferably between the values indicated in the above formula (1).

Thanks to the present invention, it is possible to utilize in a simple and effective manner the flowrate—under stationary conditions—of the liquid fed to the perforated surface for the formation of the second jets in order to obtain a controlled break-up of the latter without the drawbacks deriving from the methods according to the prior art.

According to a preferred embodiment of the present method, the sectors are side-by-side and the momentum of the liquid fed to a predetermined sector is different from the momentum of the liquid fed to a sector adjacent thereto.

According to this embodiment, the momentum of the liquid fed to each sector is advantageously changed by imparting to the perforated surface a relative motion with respect to a liquid distributor provided upstream of said surface for the delivery of the first jets.

The relative motion is preferably carried out by moving the perforated surface with respect to the liquid distributor while holding constant the distance between them.

Preferably, the effective disturbance transmitted to the second jets is generated by changing periodically with a predetermined frequency the number of first jets fed to a predetermined sector.

Advantageously, the first jets of liquid fed to the sectors are delivered with a substantially centrifugal flow by the distributor to the perforated surface which is substantially of tubular shape and is arranged externally and coaxially with respect to the distributor.

Preferably, the perforated surface of substantially tubular shape is rotated around its axis and the sectors extend longitudinally in this surface.

In this manner it is possible to distribute radially the second jets to be broken up to obtain a 'rain' at 360° of substantially monodispersed drops which depart radially from each other.

Preferably, the first liquid jets fed to the sectors intersect orthogonally the related liquid head in such a manner as to avoid formation of secondary turbulence near the perforated surface which would negatively influence the controlled break-up of the second jets.

In accordance with the method according to the present invention, the wave function obtained from periodic change in the momentum of the liquid fed to each sector is preferably of the sinusoidal type so as to avoid the presence of second oscillations within the liquid.

According to another aspect of the present invention, there is also made available a device for the break-up of liquid jets for the production of substantially monodispersed drops comprising:

a first liquid distributor comprising a perforated wall for delivering a plurality of first liquid jets having steady motion;

a second liquid distributor supported at a predetermined distance from the first distributor and divided in a plurality of chambers in fluid communication with the first jets and of equal volume and mutually independent and provided with a perforated wall substantially parallel with the perforated wall of the first distributor for formation of a plurality of second liquid jets;

with the first and second distributors having relative motion with respect to each other so as to vary periodically with predetermined frequency the momentum of the liquid fed to a predetermined chamber while imparting to the liquid present in this chamber a disturbance of predetermined magnitude consisting of a periodic change in the pressure transmitted to the second liquid jets to cause controlled break-up thereof into a plurality of substantially monodispersed drops.

The characteristics and advantages of the invention are set forth in the description of an embodiment thereof given below by way of non-limiting example with reference to the annexed drawings.

DETAILED DESCRIPTION OF A PREFERRED EMBODIMENT

With reference to FIGS. 1 to 4, reference number 1 indicates as a whole a device for the controlled break-up of liquid jets according to the present invention especially suited for prilling of melted material, e.g. melted urea, for fertilizer production.

Figure 1:
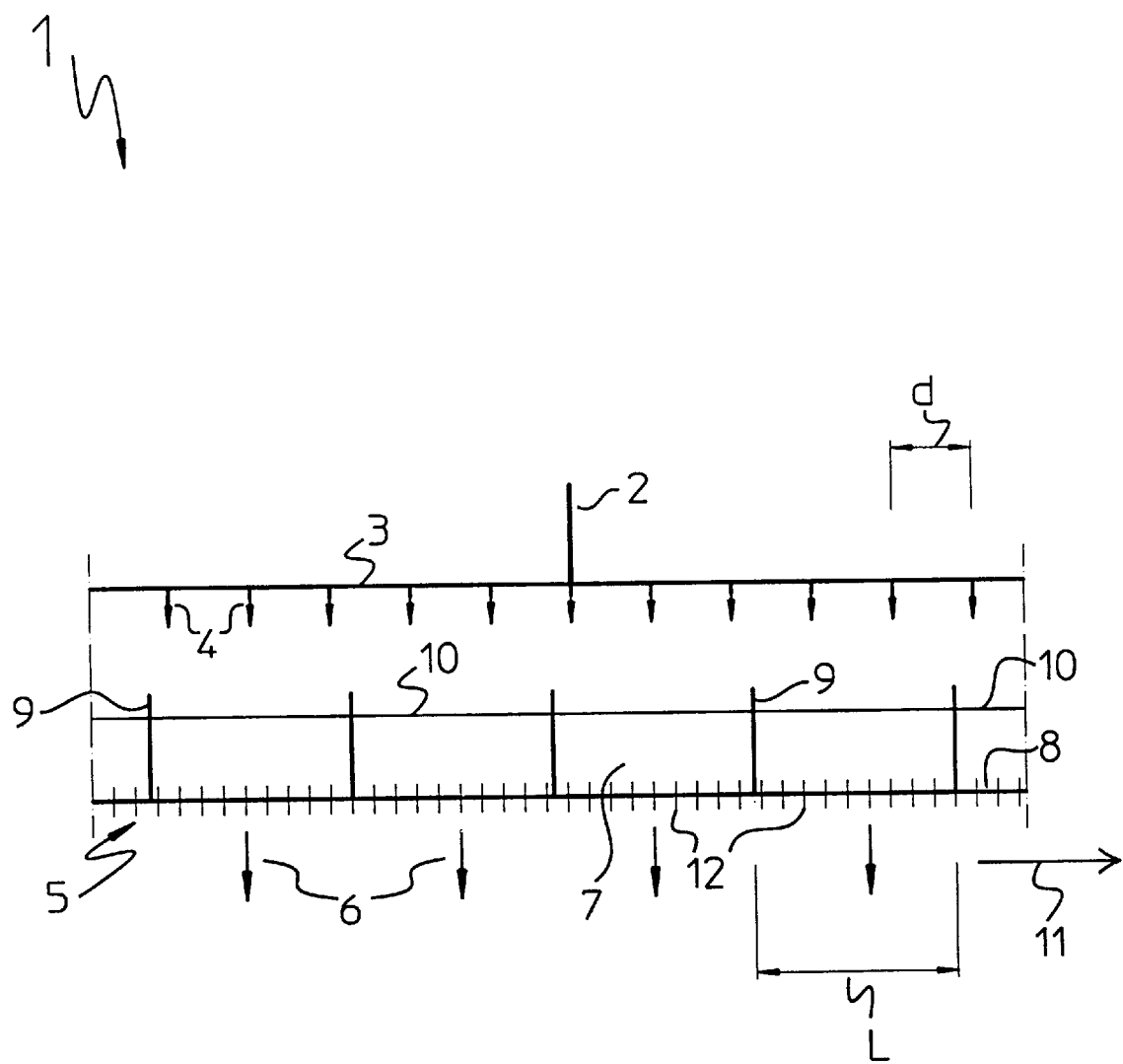
FIG. 1 shows a schematic view in longitudinal cross section of a detail of a device for the controlled break-up of liquid jets according to the present invention.

FIG. 1 shows schematically only a detail of the device 1 for the controlled break-up of the liquid jet to better point out the principles of the method according to the present invention.

The device 1 comprises a first liquid distributor 2 comprising a perforated wall 3 for delivery of a plurality of first liquid jets 4 having steady motion.

Preferably, these jets 4 are delivered by respective openings in the perforated wall 3 arranged in substantially parallel rows and extending longitudinally for a predetermined section of the distributor 2 in the direction normal to the plane of FIG. 1.

As an alternative, the openings in the perforated wall 3 consist of a plurality of substantially parallel longitudinal slits also extending in a direction normal to the plane of FIG. 1. In this case the jets 4 are delivered in the form of corresponding blades of liquid extending along the above mentioned slits.

Consequently, for each jet 4 indicated in FIG. 1 there is advantageously a corresponding row of openings or a longitudinal slit.

A second distributor 5 is supported at a predetermined distance from the first distributor 2 for the formation of second liquid jets 6.

The second distributor 5 is divided in a plurality of side-by-side chambers—all indicated by reference number 7—in fluid communication with the first jets 4 and of equal volume and mutually independent and provided with a perforated wall 8 substantially parallel with the perforated wall 3 of the first distributor 2.

The chambers 7 are also provided with respective side walls 9 which extend orthogonally from the perforated wall 8 so as to make the chambers 7 hydraulically independent.

Reference number 10 indicates a liquid head present near the perforated wall 8 and intersected orthogonally by the jets 4.

The first and second distributor—2, 5 respectively—have relative motion with respect to each other while however remaining always at the same distance. In particular in the example of FIG. 1 the second distributor 5 is mobile with respect to the distributor 2 in the direction indicated by the arrow 11.

Preferably, the holes 12 in the perforated wall 8 are identical and have rounded inlets.

In this manner, there is eliminated the risk of formation of disturbance within the liquid jets 6 which would negatively influence their break-up.

As shown in FIG. 1, the width L of the chamber 7 is advantageously different from a multiple of the distance d between two first jets 4 of the distributor 2 measured in the direction 11 of relative motion.

Figure 2:
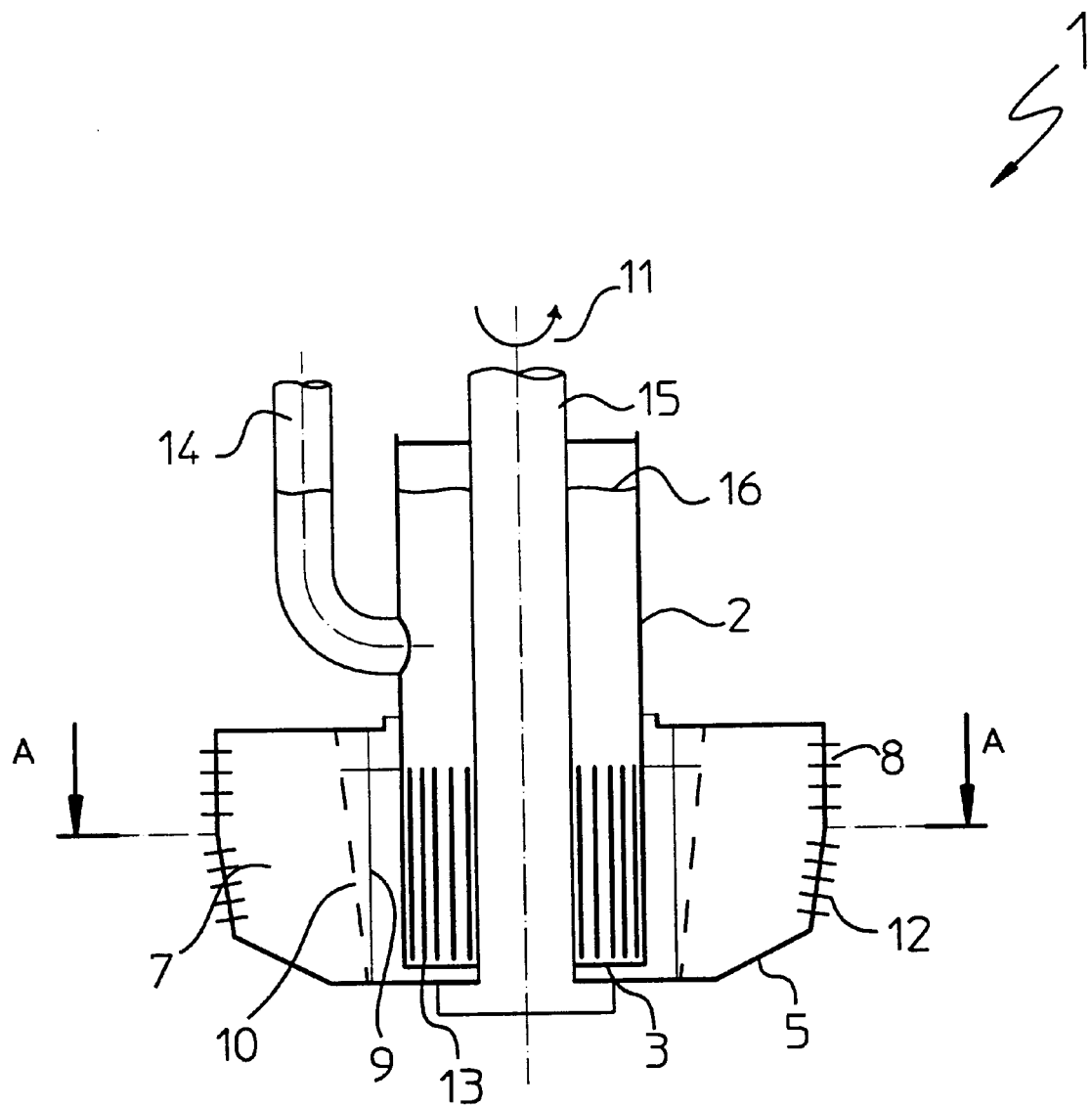
FIG. 2 shows a schematic view in longitudinal cross section of a device for the controlled break-up of liquid jets according to a preferred embodiment of the present invention.
Figure 3:
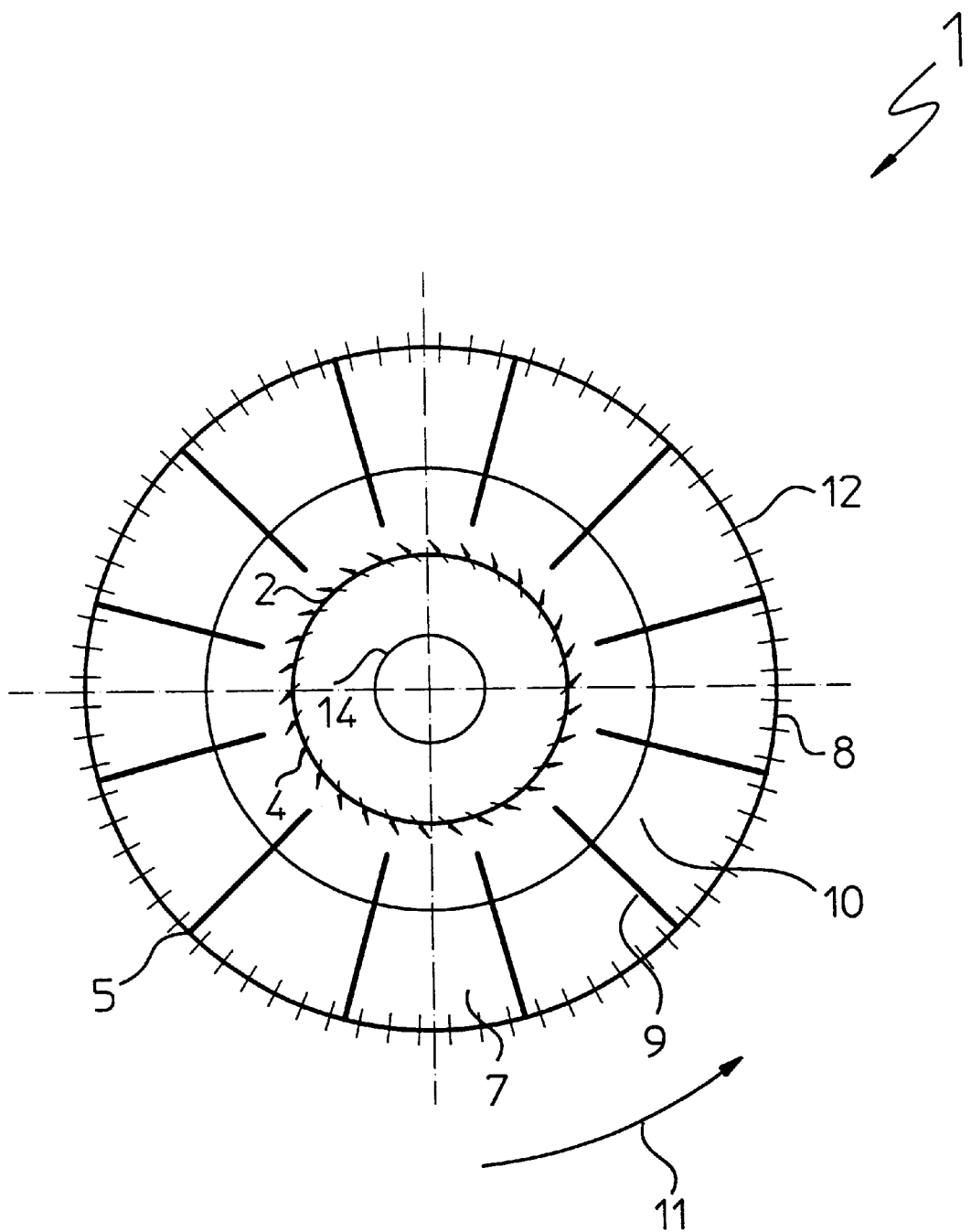
FIG. 3 shows a cross section view of the device of FIG. 2 taken along lines A—A of FIG. 2.
Figure 4:
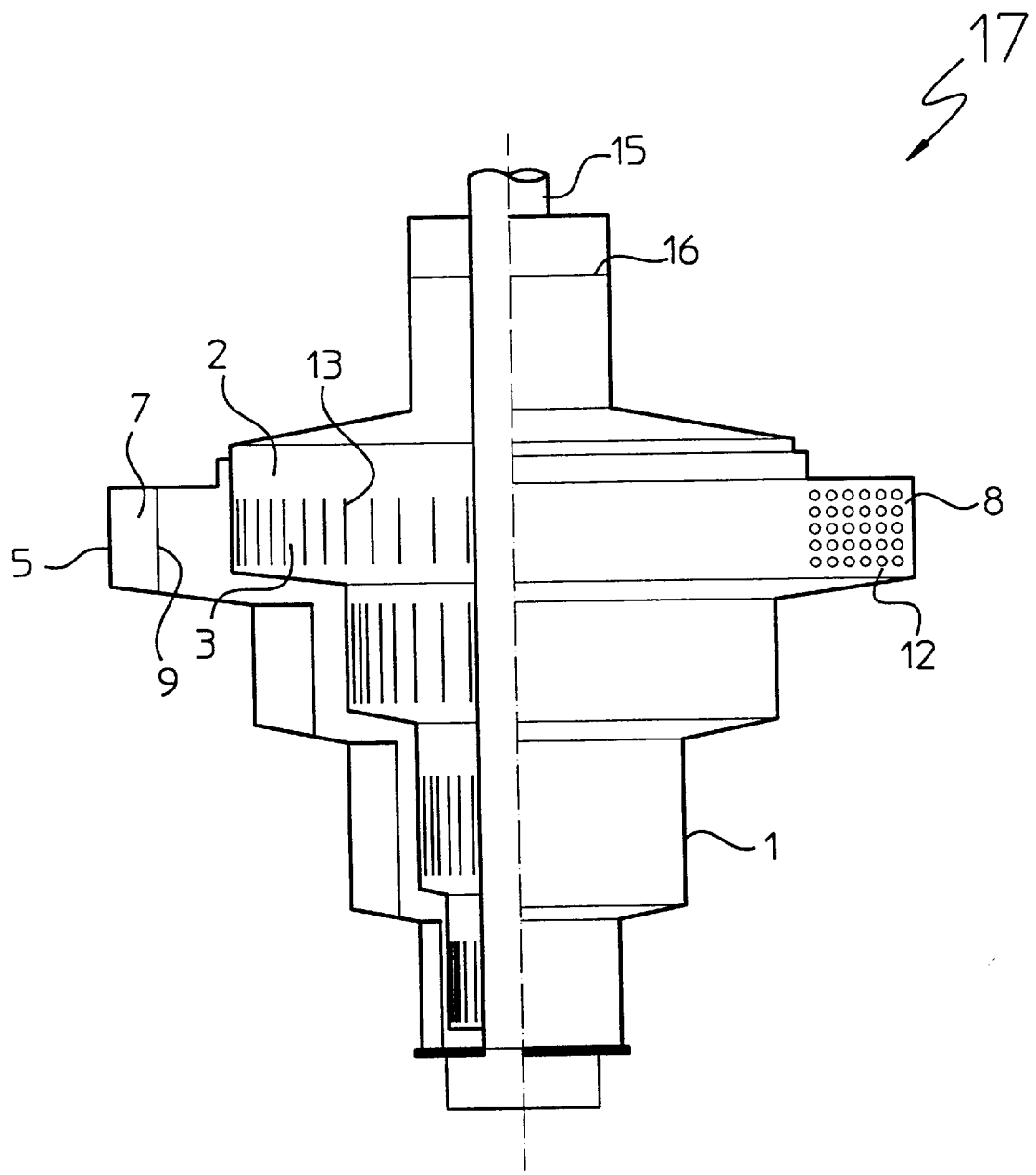
FIG. 4 shows a schematic view in longitudinal cross section of an apparatus for the controlled break-up of liquid jets according to the present invention.

This distance d is understood as the angular distance in the examples of FIGS. 2 to 4, and is constant along the entire distributor 2.

Preferably, the width L of the chamber 7 is:

$$L = n^*d + d/2$$

where n is a whole number between for example 1 and 100.

In the following description and the subsequent claims, by parameter n it is intended to mean the minimum number of rows of liquid jets or blades fed to a predetermined chamber 7. For instance, in FIG. 1 n is equal to 2.

With the above mentioned formula, there is advantageously obtained the maximum pulsation intensity of the pressure of the liquid near the holes 12.

By moving the second distributor 5 with respect to the first distributor 2 in the direction of the arrow 11, i.e. horizontally and with uniform straight-line motion, the number of jets 4 fed to a predetermined chamber 7 changes periodically—with a frequency which depends on the speed of movement—and is different from the number of jets 4 fed to a chamber 7 adjacent thereto.

In the case of FIG. 1, the number of jets 4 fed to a predetermined chamber 7 changes—in the cross section considered in FIG. 1—from 2 to 3 and vice versa.

Consequently, the momentum of the liquid fed to a predetermined chamber 7 also changes periodically to impart thereby to the liquid present near the holes 12 in the perforated surface 8 a periodic change in the pressure causing a controlled break-up of the second jets 6 in a plurality of substantially monodispersed drops (not shown).

Indeed, the pulsing pressure of the liquid near the perforated wall 8 is transmitted to the jets 6 leaving the distributor 5.

The value of this pressure (P) is given by the following formula:

$$P = D^*g^*h + m^*M^*(v1-v2)/A \quad (3)$$

where D is the density of the liquid, h is the height of the liquid level inside a predetermined chamber 7, g is gravity acceleration, m is the number of jets 4 fed to a predetermined chamber 7, M is the flowrate expressed as mass in the unit of time of a liquid jet 4, v1 and v2 are respectively the velocity of the liquid in the jets 4 fed to the perforated surface 8 and the velocity of the liquid immediately upstream of the holes 12, and A is the area of the perforated surface 8 of the chamber 7.

Generally, v2 has a very small value on the order of a few tenths or hundredths of v1.

Advantageously, according to the present invention, the pressure P in a predetermined chamber 7 is made to change periodically in time—for the purpose of imparting to the liquid jets 6 a periodic effective disturbance such as to control its break-up—by appropriately changing the momentum of the liquid fed to the chamber, and precisely by changing at least one of the variables m, M and v1 of the formula (3), while—however—holding constant in time the flowrate M and the velocity v1 of all the jets 4 delivered by the liquid distributor 2.

In particular, in the examples given here, the periodic change in pressure imparted to the liquid leaving the holes 12 in a predetermined chamber 7 is made to depend on the number m of jets 4 fed to this chamber.

If the jets shown in FIG. 1 are considered spatially in a direction normal to the plane of FIG. 1, i.e. as rows of liquid jets or blades, the number of these liquid rows or blades fed to a predetermined chamber 7 changes preferably from n to n+1 where n is the whole number defined above.

The pulsing intensity of the pressure P is defined by the ratio of the maximum pressure change possessed by the liquid near the perforated wall 8 to its average value.

Generally, this ratio is also indicated by the term 'pulse intensity'.

Expressed in algebraic terms, the maximum pressure change if only the variable m is operated upon is given by the formula:

$$\Delta P\max = \Delta m^*M^*(v1-v2)/A \quad (4)$$

where P is the liquid pressure near the holes 12, while for the meaning of the symbols m, M, v1, v2 and A reference is made to the above formula (3).

The average value of the pressure is given by the following formula:

$$P(\text{average}) = D^*g^*h + m(\text{average})^*M^*(v1-v2)/A \quad (5)$$

For the meaning of the symbols expressed in this formula reference is made to the above formula (3).

Indicating by f(n) the ratio 2/(2n+1), there is obtained a pulse intensity defined by the following formula:

$$\Delta P\max/p(\text{average}) = f(n)/(1+g*h/v1*v2) \quad (6)$$

Substituting g*h with $v^2/2$ where v is the flow velocity of the liquid through the holes 12, the formula (6) becomes:

$$\Delta P\max/p(\text{average}) = f(n)/(1+v^2/2v1*v2) \quad (7)$$

By way of example, by inserting in the formula (7) the values of the variables defined as follows: v=2 m/s, v1=3.5 m/s, v2=0.1 (average value) and n=4, there is obtained a pulse intensity of the pressure P equal to $\Delta P\max/p(\text{average})$=0.007.

Assuming a density D of the liquid of 1200 kg/m$^3$, for this pulse intensity there is a corresponding maximum variation of the pressure $\Delta P\max$ of approximately 50 N/m$^2$.

As may be seen from the foregoing, the disturbance induced in the liquid jets 6 flowing from the perforated wall 8 is advantageously on the order of one hundred times the minimum value necessary to control the break-up of the jets (which is on the average on the order of a few tenths of an N/m$^2$, as can be derived from EP-A-0 320 153), even though operating with a very small velocity v1.

As an alternative, according to an embodiment not shown of the present method, the pulse intensity is made to depend on the flowrate M or the velocity v1 of the first liquid jets fed to the chambers 7, while holding constant the number m of liquid jets 4.

According to this embodiment, to the chambers is imparted a relative motion with respect to the first distributor which has a plurality of slits or rows of holes uniformly distributed. In addition, the width of the chambers 7 is preferably equal to a multiple of the distance—measured in the direction of relative motion—between two consecutive slits of the first distributor.

To act on the flowrate M, these slits have for example a cross section area variable periodically in the direction of relative motion, so that the flowrate and thus the momentum of the liquid fed to a predetermined chamber changes advantageously periodically at a predetermined frequency.

If it is intended to act on the variable v1, the velocity of the liquid jets delivered from the first distributor is advantageously different, in a periodical way, between adjacent jets in the direction of the relative motion, so that the velocity and hence the momentum of the liquid fed to a predetermined chamber changes periodically at a predetermined frequency.

This change of velocity can be obtained by an appropriate geometry of the holes in the first distributor to which correspond different flow coefficients, or by means of liquid feeds at different pressures. The practical implementation of these provisions is in any case within the ability of those skilled in the art and accordingly will not be described in greater detail.

It is also possible to make the above mentioned pulse intensity dependent on several variables simultaneously, e.g. on the number m of jets and the flowrate M or on the flowrate m and the velocity v1.

According to an embodiment not shown of the second distributor 5 of FIG. 1, the chambers 7 can be mutually separated by unperforated zones which would prevent the formation of the liquid jets 6.

In this manner, by appropriately modifying the width of the zones and their arrangement, it is possible to obtain a phased pressure change of the liquid present in the different chambers 7.

For example, by alternating in the distributor 5 a chamber 7 with an unperforated zone of the same surface area, the momentum imparted to the liquid present in a present in a predetermined chamber at a given moment is advantageously equal to that imparted to the liquid present in the other chambers.

In the example of FIGS. 2 and 3, the first and second distributors—2, 5 respectively—are of substantially tubular shape with the second distributor 5 arranged externally to and coaxially with the first distributor 2. The openings in the perforated wall 3 of the first distributor 2 consist of a plurality of longitudinal slits 13 or as an alternative with corresponding rows of holes.

In addition, each of the chambers 7 extends radially and for the length of the second distributor 5 which is free to rotate around its axis, e.g. in the direction indicated by the arrow 11.

In this case, the width L of the chambers 7 and the distance d between two openings in the first distributor 2 are angular and determined in sexagesimal degrees. Accordingly, if d is e.g. 5°, for n=4 we have a width L of 22.5° to which correspond sixteen chambers 7 (360°/22.5°= 16).

According to the present invention, the angular distance d between two liquid jets 4 is in turn advantageously made to depend on the frequency of change of the momentum which it is desired to impart to the liquid mass present in a predetermined chamber 7.

In particular the distance d—measured in the direction of relative motion—between two consecutive openings of the first distributor 2 is:

$$d = 6*N/F$$

where d is the angular distance in sexagesimal degrees—measured in the direction of relative motion—between two consecutive openings in the first distributor 2, N is the velocity of rotation of the second distributor 5 in rpm, and F is the frequency (expressed in Hz) of the periodic disturbance necessary for controlling the break-up of the jets 6.

The value 6 of the formula set forth above represents the conversion factor for expressing the angular amplitude in sexagesimal degrees.

For example, if it is desired to give the jets 6 leaving the holes 12 a periodic disturbance having a frequency F of 700 Hz at a rotation speed N of 280 rpm, the resulting angular distance is d=2.4°, to which corresponds a number of longitudinal slits 13 equal to 150 (360/2.4=150).

Reference numbers 14, 15 and 16 indicate respectively a liquid supply duct to the first distributor 2, a shaft for controlling the rotation of the second distributor 5 with respect to the first one, and a head of liquid present in the first distributor 2.

The perforated wall 8 of the second distributor 5 is advantageously equipped internally with suitable means (not shown) for the absorption of turbulence generated within the liquid present in the chamber 7 during operation of the device 1.

These means are of known type, e.g. screens, and are not further described.

In this manner it is possible to ensure a laminar flow of the second jets 6.

In order to avoid rotation of the side walls 9 which would intercept the jets 4 in such a manner as to partially absorb their momentum, the thickness of the walls 9 is preferably very thin on the order of a small fraction of the distance d between two consecutive jets 4. Advantageously this thickens is less than 0.5 d.

According to an alternative embodiment (not shown) of the present device, the number m of liquid jets 4 fed to a predetermined chamber is made to change periodically in time by providing advantageously relatively thick side walls 9, preferably having a width between 0.25 and 0.75 times the distance d between two consecutive jets 4 and advantageously of a width of 0.5 d.

In this case, the width L of the chambers 7 is equal to a multiple of the distance d, i.e. L=n*d, where n is a whole number e.g. between 1 and 100.

With this type of division of the chambers 7, there is obtained—during rotation of the distributor 5—an interception by the side walls 9 of a predetermined number of jets 4 so that the number m of jets 4 actually fed to a predetermined chamber 7 changes periodically in time.

In accordance with the method according to the present invention, a plurality of first liquid jets 4—e.g. of melted material—having stationary motion are advantageously fed to a plurality of sectors represented by the chambers 7 which are mutually independent and have equal surface area and are defined in a perforated wall 8 of the second distributor 5. In these sectors is formed a liquid head 10 near the perforated surface 8 through which is made to flow the liquid for forming a plurality of second jets 6.

Advantageously, the momentum of the liquid fed to a predetermined sector is made to change periodically at a predetermined frequency so as to impart to the liquid present in this sector a corresponding change in the momentum and transmit to the second jets 6 a disturbance of predetermined magnitude such as to cause controlled breakup of the second jets 6 in a plurality of substantially monodispersed drops.

Preferably, the sectors are mutually adjacent and the momentum of the liquid fed to a predetermined sector is different from the momentum of the liquid fed to a sector adjacent thereto.

In addition, the width of the sectors is advantageously different by a multiple of the distance between two consecutive first jets 4 fed to the sectors measured in the direction of relative motion.

According to a preferred embodiment of the present method the momentum of the liquid fed to the sectors is advantageously made to change by imparting to the perforated surface 8 a relative motion with respect to the first distributor 2 provided upstream of the surface 8.

Preferably, as shown in FIGS. 2 and 3 the liquid jets 4 are fed to the sectors (or chambers 7) with a substantially centrifugal flow from the first distributor 2 to the perforated surface 8 which is substantially of tubular shape and is arranged externally to and coaxially with the distributor 2.

In accordance with another embodiment (not shown) of the method according to the present invention, the first jets 4 are advantageously delivered from a plurality of openings distributed non-uniformly in the first distributor 2.

For example, these openings are arranged in a plurality of parallel rows having a distance periodically variable in the direction of relative motion.

The method of the present invention is particularly suited to prilling processes for the formation of fertilizers starting from a melted material such as for example urea or ammonic nitrate.

According to a very advantageous embodiment of the device for implementation of the present method (not shown), the openings in the perforated wall 3 of the first distributor 2 are arranged in parallel rows inclined with respect to the axis of rotation of the second distributor 5.

In the example of FIG. 2, the slits 13 would thus be inclined to the rotation axis of the second distributor 5.

As an alternative, according to another embodiment of the device (not shown), the intersection lines defined between the perforated wall 8 and the side walls 9 are inclined to the rotation axis of the second distributor 5.

Preferably, the angle of inclination of the openings of the perforated wall 3 or of the intersection lines is less than 2°.

Thanks to the above mentioned inclination, it is advantageously possible to obtain a wave function of the pressure P of the liquid in the perforated wall 8 of sinusoidal type.

In other words, the change in the momentum of the liquid fed to a predetermined chamber takes place in this case very gradually to cause a substantially sinusoidal shaped pulse of the pressure possessed by the liquid near the perforated surface 8.

In FIG. 4, reference number 17 indicates as a whole an apparatus for the controlled break-up of liquid jets for the production of substantially monodispersed drops, comprising a plurality of superimposed devices 1 of the type shown in FIG. 2.

Advantageously, the devices 1 have a diameter decreasing downward in such a manner that the liquid jets 6 and consequently the drops formed by their break-up are projected radially outward with velocity decreasing from above downward.

In this manner there is obtained in a constructively simple and economical manner a shower of drops in the form of rings of different diameter.

Apparatus of this type can thus be advantageously installed in prilling towers of known type for the formation of substantially monodispersed granules, which towers are thus sprayed uniformly.

Preferably, the diameter of the devices 1 decreases by approximately ⅓ from one device to the next.

As an alternative, the holes 12 in the second distributor 5 of the device 1 of FIG. 2 can be provided in such a manner as to have a slope with respect to the perpendicular axis of the perforated surface 8 such as to obtain also in this case a shower of drops in the form of rings of different diameter.

Advantageously, both the device 1 of FIG. 2 with the holes 12 appropriately inclined and the apparatus of FIG. 4 with the holes 12 normal to the wall 8, can be employed in large-diameter prilling towers, e.g. up to over 24 m.

From the foregoing description emerge clearly the numerous advantages achieved by the method according to the present invention; in particular it is possible to obtain substantially monodispersed drops by a method easy to implement, reliable in time and not requiring high energy consumption or operating and maintenance costs.

What is claimed is:

1. Method for the controlled break-up of liquid jets for the production of substantially monodispersed drops comprising the steps of:

feeding a plurality of first liquid jets (4) having steady motion to a plurality of mutually independent sectors (7) defined in a perforated surface (8);

forming a head of liquid (10) in said sectors (7) near said perforated surface (8);

causing said liquid to flow across said perforated surface (8) to form a plurality of second liquid jets (6);

periodically changing with a predetermined frequency the momentum of the liquid fed to a predetermined sector (7) so as to impart to the liquid present in said sector a disturbance of predetermined magnitude consisting of a periodic change in the pressure near said perforated surface (8) which is transmitted to the second liquid jets (6) causing their controlled break-up in a plurality of substantially monodispersed drops.

2. Method according to claim 1, characterized in that said sectors are arranged side-by-side and that the momentum of the liquid fed to a predetermined sector (7) is different from the momentum of the liquid fed to a sector (7) adjacent thereto.

3. Method according to claim 1, wherein changing the momentum of the liquid fed to each of said sectors (7) is accomplished by imparting to said perforated surface (8) a relative motion with respect to a liquid distributor (2) provided upstream of said perforated surface (8) for delivery of said first jets (4).

4. Method according to claim 3, characterized in that said relative motion is performed by shifting said perforated surface (8) with respect to said liquid distributor (2) while holding constant the distance between them.

5. Method according to claim 3, characterized in that the number of said first jets (4) fed to a predetermined sector (7) varies periodically with a predetermined frequency.

6. Method according to claim 5, characterized in that said first jets (4) are arranged in substantially parallel rows of jets or liquid blades and the number of said rows or liquid blades fed to a predetermined sector (7) varies from n to n+1 and vice versa where n is a whole number.

7. Method according to claim 3, characterized in that the flowrate of said first jets (4) fed to a predetermined sector (7) varies periodically with a predetermined frequency.

8. Method according to claim 3, characterized in that the velocity of said first jets (4) fed to a predetermined sector (7) varies periodically with a predetermined frequency.

9. Method according to claim 5, characterized in that the width of said sectors (7) is equal to a multiple of the distance between two consecutive first jets (4) fed to said sectors (7) measured in the direction of relative motion, with said first jets (4) being delivered from a plurality of openings appropriately distributed in a non-uniform manner in said distributor (2).

10. Method according to claim 5, characterized in that the width of said sectors (7) is different by a multiple of the distance between two consecutive first jets (4) fed to said sectors (7) measured in the direction of relative motion, with said distance being constant along said distributor (2).

11. Method according to claim 10, characterized in that the width (L) of said sectors (7) is:

$$L = n*d + d/2$$

where L and d represent respectively the width of the sectors (7) and the distance between two consecutive first jets (4) fed to said sectors (7) measured in the direction of relative motion, and n is a whole number.

12. Method according to claim 7, characterized in that the width of said sectors (7) is equal to a multiple of the distance between two consecutive first jets (4) fed to said sectors (7) measured in the direction of relative motion, with said distance being constant along said distributor (2).

13. Method according to claim 3, characterized in that said first liquid jets (4) fed to said sectors (7) are delivered with substantially outward flow by said distributor (2) to said perforated surface (8) which is of substantially tubular shape and arranged externally and coaxially with respect to said distributor (2).

14. Method according to claim 13, characterized in that said method comprises the further step of rotating said perforated surface (8) around its own axis with said sectors (7) extending parallel to said axes and defined by said perforated surface (8) and side walls connected to said perforated surface and extending radially inward.

15. Method according to claim 14, characterized in that the distance (d) between two consecutive first liquid jets (4) fed to said sectors (7) measured in the direction of relative motion is:

$$d = 6*N/F$$

where d represents the angular distance in sexagesimal degrees between two consecutive first liquid jets (4) fed to said sectors (7) measured in the direction of relative motion, N represents the speed of rotation in rpm of the perforated surface (8) and F represents the frequency expressed in Hz of the periodic disturbance necessary for controlling the break-up of the second jets (6).

16. Method according to claim 1, characterized in that said first liquid jets (4) fed to said sectors (7) intersect orthogonally said liquid head (10).

17. Method according to claim 3, wherein the wave function obtained by periodic variation of the momentum of the liquid fed to each of said sectors (7) is of sinusoidal type.

18. Method according to claim 2, wherein changing the momentum of the liquid fed to each of said sectors (7) is accomplished by imparting to said perforated surface (8) a relative motion with respect to a liquid distributor (2) provided upstream of said perforated surface (8) for delivery of said first jets (4).

19. Method according to claim 8, wherein the width of said sectors (7) is equal to a multiple of the distance between two consecutive first jets (4) fed to said sectors (7) measured in the direction of relative motion, with said distance being constant along said distributor (2).

* * * * *